United States Patent [19]
Krietzman

[11] Patent Number: 5,909,062
[45] Date of Patent: Jun. 1, 1999

[54] SECONDARY POWER SUPPLY FOR USE WITH HANDHELD ILLUMINATION DEVICES

[76] Inventor: Mark Howard Krietzman, P.O. Box 3185, Rhe, Calif. 90274

[21] Appl. No.: 09/038,726

[22] Filed: Mar. 10, 1998

[51] Int. Cl.[6] ........................................................ H02J 7/00
[52] U.S. Cl. .............................. 307/64; 307/66; 307/150; 362/158
[58] Field of Search .................................. 307/43, 44, 64, 307/65, 66, 80, 85, 150; 362/158, 184, 205, 206, 259, 203

[56] References Cited

U.S. PATENT DOCUMENTS

| | | | |
|---|---|---|---|
| 3,976,986 | 8/1976 | Zabroski | 307/66 |
| 4,680,682 | 7/1987 | Parker | 362/158 |
| 5,336,977 | 8/1994 | Li | 315/159 |
| 5,343,376 | 8/1994 | Huang | 362/259 |
| 5,349,506 | 9/1994 | Maglica | 362/158 |
| 5,349,507 | 9/1994 | Parker | 362/158 |

Primary Examiner—Richard T. Elms
Assistant Examiner—Jonathan S Kaplan
Attorney, Agent, or Firm—Mark Krietzman

[57] ABSTRACT

A secondary or redundant battery supply which nests in-line in a tubular or oval housing. The present invention also provides for a flashlight or flashlight laser illuminator with a secondary or redundant battery supply.

20 Claims, 5 Drawing Sheets

SECONDARY POWER SUPPLY FOR USE WITH HANDHELD ILLUMINATION DEVICES

RELATED APPLICATIONS

The within invention is related to applicant's application: "LASER LIGHT", filed Aug. 21, 1997, Ser. No. 08/918,514.

BACKGROUND OF THE INVENTION

1. Field of the Invention

This present invention relates to a novel redundant and secondary power supply for use with both submersible and non-submersible handheld illumination devices such as flashlights, laser pointing devices or the combination of both such as those disclosed in applicants' related application Ser. No. 08/918,514, and more particularly to a novel redundant or secondary power supply for use within a ovoid or round cylindrical flashlight-type body for supplying back-up current to a primary illumination source, or for supplying current to a secondary illumination source.

2. Background

The benefits of a combination flashlight for illumination, and laser pointer for precise communication are set forth in applicant's related application Ser. No. 08/918,514. Moreover, those acquainted with underwater or emergency situations will recognize the associated benefits of having selectable secondary or redundant power sources should the first source fail.

Uses of the redundant or secondary power supply nested inside a tubular flashlight housing include supplying power to a second illumination source such as a laser, LED, or a second filament in a dual filament light bulb.

Those familiar with handheld flashlights will recognize the utility of having a switchable secondary or back-up power supply available should the primary system fail. This simple removable in-line module, which fits neatly into a flashlight body and, acts as both a conductive link for the primary power supply and a independent secondary power supply provides a new measure of reliability for those using handheld illumination devices.

SUMMARY OF INVENTION

Accordingly, it is an object of the invention to provide a novel redundant battery power supply.

It is yet another object of the invention to provide a novel secondary battery power supply.

It is yet another object of the invention to provide a novel handheld redundant or secondary battery power supply for use with flashlights.

It is yet another object of the invention to provide a novel handheld redundant or secondary battery power supply for use with laser illuminators.

It is yet another object of the invention to provide a novel handheld redundant or secondary battery power supply for use with combined flashlight lasers illuminators.

It is yet another object of the invention to provide a novel handheld redundant or secondary battery power supply for use with submersible flashlight, laser illuminators, and combined flashlight laser illuminators.

It is yet another object of the invention to provide a novel secondary battery power carriage which fits in-line with a primary series of dry-cell batteries and acts as a conductive link for the primary battery supply and provides a secondary battery power supply.

The features of the invention believed to be novel are set forth with particularity in the appended claim. The invention itself, however, both as to configuration, and method of operation, and the advantages thereof, may be best understood by reference to the following descriptions taken in conjunction with the accompanying drawings.

MODES FOR CARRYING OUT THE INVENTION

Figure 1A:
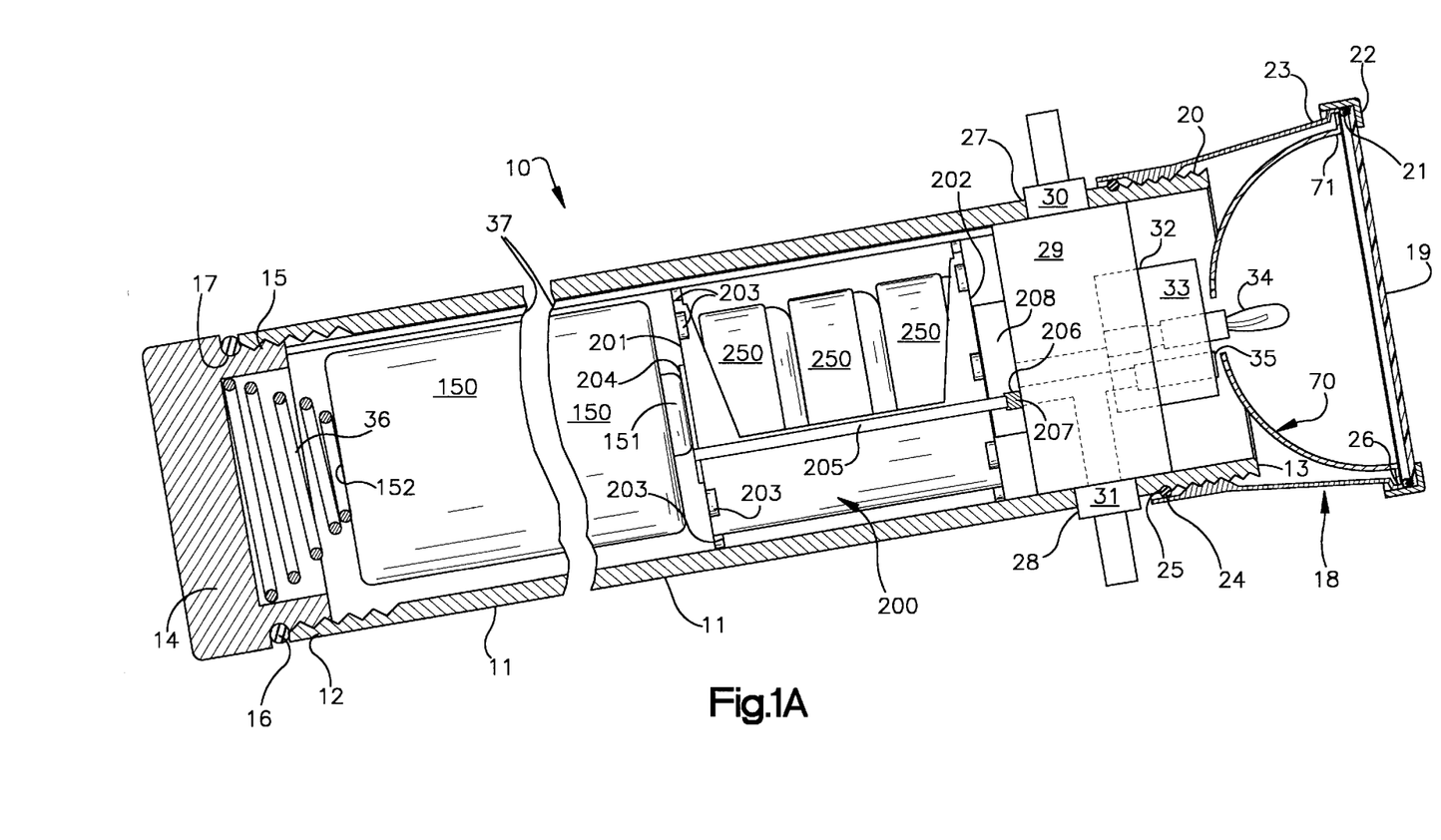
FIG. 1A illustrates a cut-away side view of the preferred embodiment of the redundant and secondary power supply carriage mounted in a handheld illuminator.

Referring now to the drawings, there is illustrated in FIG. 1A a cut-away side view of a handheld flashlight and laser illuminator generally designated 10 utilizing the preferred embodiment of the redundant or secondary power supply and carriage generally designated 200.

The redundant or secondary power supply and carriage 200 is inserted into a tubular housing 11. The tubular housing 11 has an internally threaded tail 12 and an externally threaded front 13.

A water-tight tail cap 14 is removably mounted into the internally threaded tail 12 via a series of tail mating threads 15. The water-tight seal is provided by a large "O" ring 16 secured to the tail cap 14 in a large "O" ring groove 17.

A water-tight head cover 18 with a clear water-sealed front lens 19 is adjustably mounted over the externally threaded front 13 via a series of internal front mating threads 20. A water-tight seal is formed by interposing a rubber-like ring 21 between the clear lens 19 and the lens collar 22 which is affixed to the front edge 23 of the head cover 18. The water-tight seal for the head cover 18, mating it to the externally threaded front 13, is provided by a medium "O" ring 24 secured to the externally threaded front 13 in a medium "O" ring groove 25.

Affixed inside the water-tight head cover 18 is a parabolic reflecting dish 70 held in place by an extended front lip 71. The extended front lip 71 fits snugly into the dish guide 26 formed by the front edge 23 of the head cover 18. When assembling the head cover 18 the parabolic dish must be inserted into the head cover 18 before the lens 19 and lens collar 22 are affixed, the parabolic reflecting dish 70 is secured to the head cover 18.

A first switch guide 27 and a second switch guide 28 are formed through the tubular housing 11. Mounted within the front portion of the tubular housing 11 is a non-conductive switching box 29. A first water-tight electrical switch 30 and a second water-tight electrical switch 31 are mounted to the non-conductive switching box via the first switch guide 27 and the second switch guide 28 respectively, whereby a water-tight seal is formed between the respective guides and switches.

Removably inserted into the illumination mount 32 formed in the front face of the non-conductive switching box 29 is the illumination head 33 which houses a light bulb 34 and a laser emitting diode with drive circuitry 35. The light bulb 34 and the laser emitting diode with drive circuitry 35 are electrically connected via lead wires, (shown in FIG. 1D), to the first and second electrical switches 30 & 31. The laser emitting diode 35 is readily available and is known art. The diode comprises a laser beam module with a control circuit. Since the laser emitting diode is well known in the art, it is unnecessary to present a detailed statement of its construction.

Located at the rear of the non-conductive switching box 29 are a series of electrical contact guides (shown in FIG. 1D) through which the electrical leads for the electrical circuits supplying power to the illumination head 33 are in contact with the primary and secondary power supplies via the secondary power supply and carriage 200.

When inserting the power supplies, the secondary power supply and carriage 200 must be inserted first through the internally threaded tail 12. The secondary power supply and carriage 200 is formed of a roughly half-cylindrical body with a circular rear face 201 and a circular front face 202 of a diameter smaller than the inside diameter of the tubular housing 11. A plurality of non-conductive spacing arms 203 project from both faces 201 & 202 and are of a size and shape to allow the removable insertion of the secondary power supply and carriage 200 into the tubular housing 11. The primary power supply 150 is inserted into the housing following the secondary power supply 200. A conductive link contact 204 is formed as part of the outer wall of the rear face 201 of the secondary power supply 200 whereby a positive electrical contact is made with the front terminal 151 of the primary power supply 150 which is conducted via the elongated carriage shunt 205 into a the shunt guide 206 and terminating as the first surface contact 207 on the face of the multiple contact plate 208 formed on the outer wall of the front face 202.

On the front of the multiple contact plate 208 is a series of conductive contacts whereby, via the multiple contact plate 208, the secondary batteries 250 are switchably connected to the non-conductive switching box 29 and the illumination head 33. Also via the multiple contact plate 208 and one terminal of the primary power supply 150 is connected to the non-conductive switching box 29 and the illumination head 33. To complete the electrical circuit for the primary power supply 150 a conductive spring 36 is affixed within the tail cap 14 which upon complete insertion of the tail cap 14 is placed in contact with a first primary battery contact 37 which electrically connects the rear primary battery terminal 152 with the non-conductive switching box 29 and the first water-tight electrical switch 30.

It is envisioned that a variety of switches may be used to control the electrical circuits such as momentary switches, rotating switches, and internal rotating switches controlled by the movement of the head cover 18 and/or the movement of the tail cap 14.

Figure 1B:
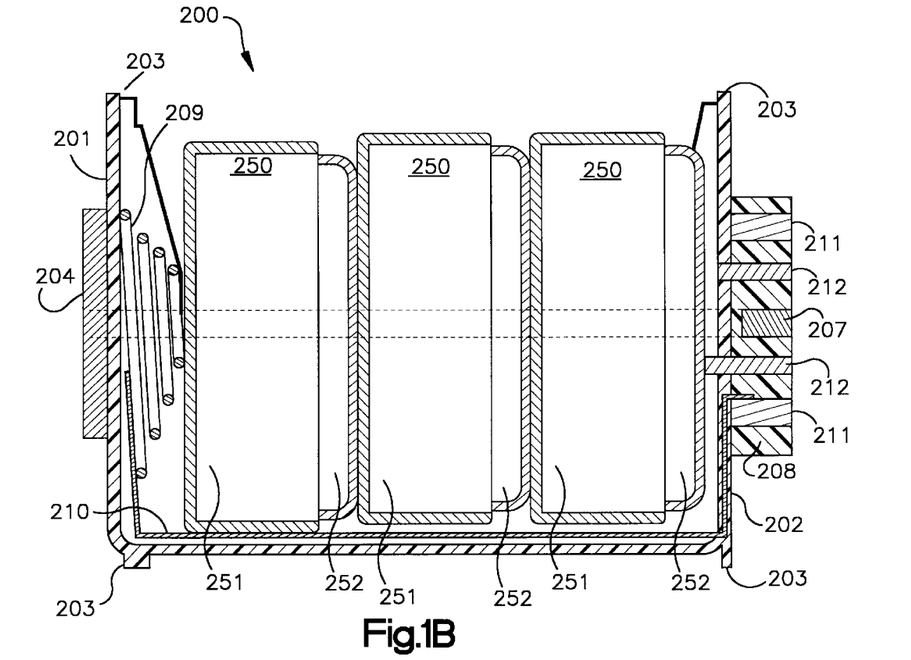
FIG. 1B illustrates a cut-away side view of the preferred embodiment of the secondary power supply and carriage of FIG. 1A.

Referring now FIG. 1B, there is illustrated a cut-away side view of the preferred embodiment of the secondary power supply and carriage of FIG. 1A generally designated 200.

The body of the secondary power supply and carriage 200 houses a small conductive spring 209 which is in contact with both the rear terminal 251 of the secondary battery supply 250 and a conductive axial secondary battery contact 210 which terminates at the second surface contact 211 on the face of the multiple contact plate 208. The third surface contact 212 traverses the front face 202 of the secondary power supply 200 and is in direct contact with the front terminal 252 of the secondary battery supply 250.

Figure 1C:
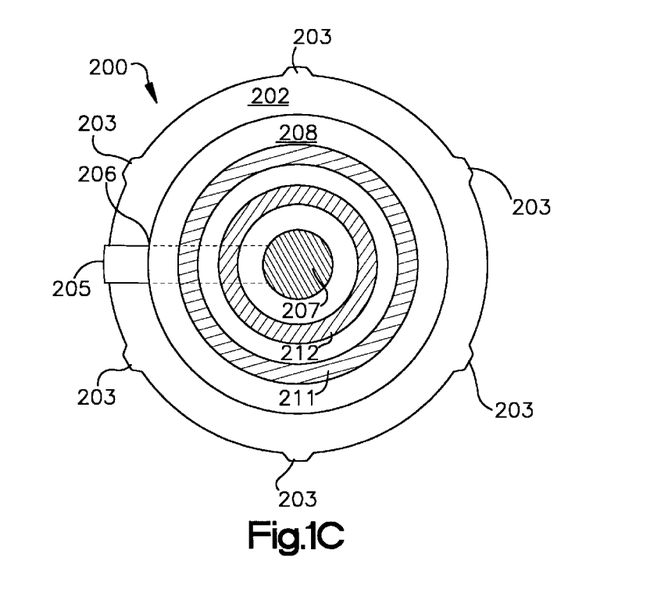
FIG. 1C illustrates a front view of the preferred embodiment of the secondary power supply and carriage of FIG. 1B.

Referring now FIG. 1C, there is illustrated a front view of the preferred embodiment of the secondary power supply of FIG. 1B generally designated 200.

Extending perpendicularly and in plane with the front face 202 of the secondary power supply and carriage 200 are a plurality of non-conductive spacing arms 203. The elongated carriage shunt 205 supplying power from the primary battery supply 150 is bent around the side of the secondary power supply and carriage 200 in-between two of the non-conductive spacing arms 203 and passes through the shunt guide 206 under the second surface contact 211 and the third surface contact 212 terminating and connecting to the first surface contact 207.

Figures 1D, 1E:
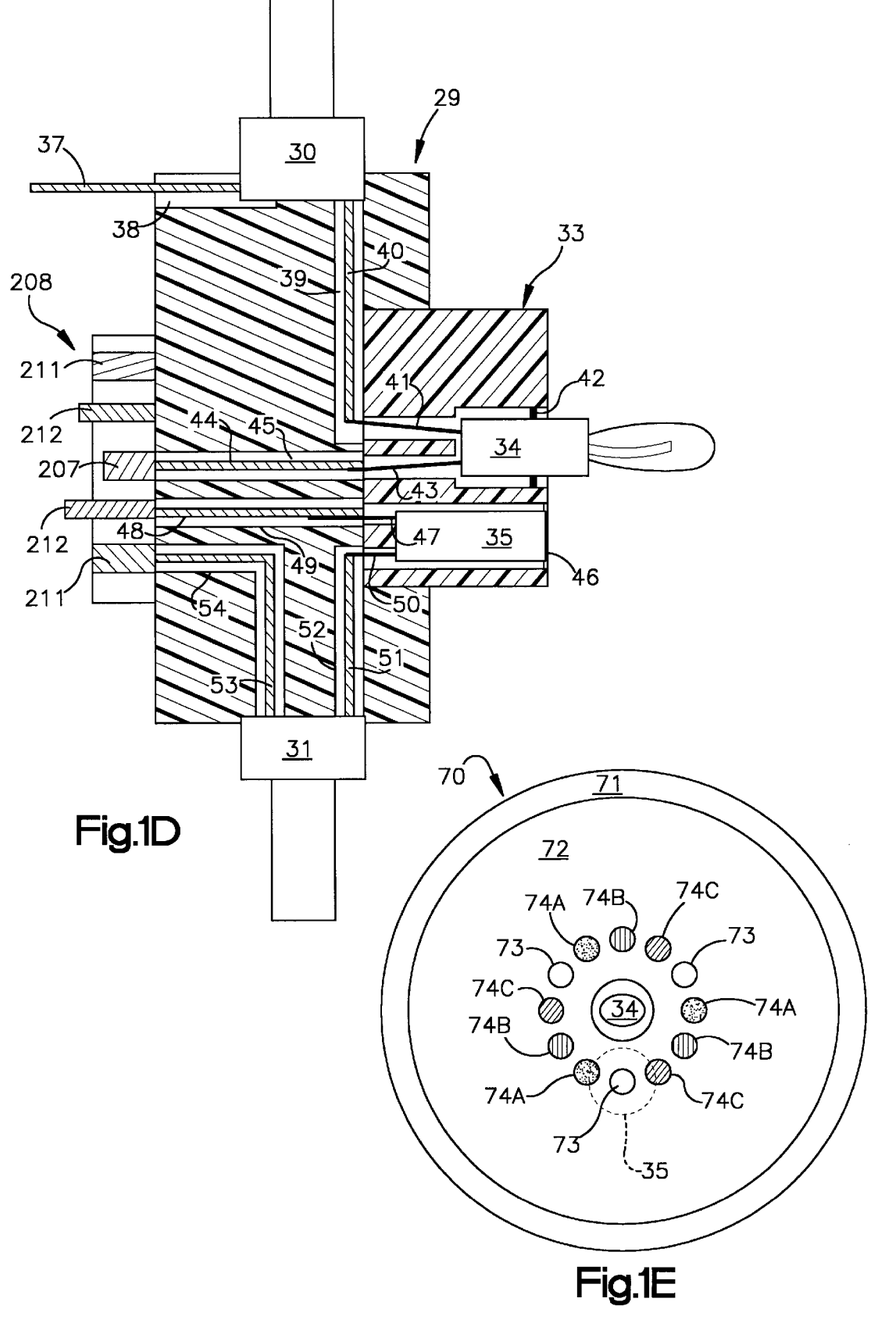
FIG. 1D illustrates a cut-away side view of the components forming the non-conductive switching plate, multiple contact plate, and illumination head of FIG. 1A.
FIG. 1E illustrates a front component view of the parabolic reflector of the preferred embodiment of FIG. 1A.

Referring now FIG. 1D there is illustrated a cut-away side view of the components forming the, multiple contact plate 208, non-conductive switching plate 29, and illumination head 33 of FIG. 1A.

Within the non-conductive switching plate 29 and the illumination head 33 are plurality of electrical contacts and guides for providing switchable electrical power from both the primary and secondary power supplies to the illumination head 33.

The first primary battery contact 37 extends from the tail cap (not shown) and passes through the first battery contact guide 38 and is electrically connected to the first water-tight switch 30. The light bulb switching contact 39 then passes through a first switch contact guide 40 and is electrically connected to the first light bulb lead wire 41 within the rear section of the light bulb guide 42. The second light bulb lead wire 43 also extends through the rear section of the light bulb guide 42 and is electrically connected to the second primary battery contact 44 which passes through the second battery contact guide 45 and is in contact with the first surface contact 207 on the secondary power supply and carriage 200.

The laser emitting diode 35 is affixed within the diode mount 46 formed in the illumination head 33. A first diode lead wire 47 extends through the rear section of the diode mount 46 and is electrically connected to the first secondary battery contact 48 which passes through the first secondary battery contact guide 49 and is connected with the third surface contact 212 on the secondary power supply and carriage 200. The second diode lead wire 50 also extends through the rear section of the diode mount 46 and is electrically connected to the second water-tight switch 31 via the diode switching contact 51 which passes through the second switch contact guide 52. The second water-tight switch 31 is connected to the second surface contact 211 on the secondary power supply and carriage 200 via the second secondary battery contact 53 which passes through the second battery contact guide 54.

Referring now FIG. 1E there is illustrated a front view of the components forming the parabolic dish of FIG. 1A, generally designated 70.

The extended front lip 71 is essentially planar and provides the fixed attachment point to the head 18 (shown in FIG. 1A.) The parabolic inner surface is covered with a reflective coating 72. A series of open windows 73 are formed within the parabolic dish 70 in an orientation to align the windows with the laser output from the laser emitting diode.

Affixed over a portion of the open windows 73 are selectable optical lenses 74A–74C for altering the beam dispersion pattern of a laser output. Materials including glass lens, plastic lens, holographic filters, interference pattern generating gratings, plastic and plastic, glass and metal gratings all yield controllable and selectable results, such as cross-hairs, underlines, or beam dispersion.

Figures 2A, 2B:
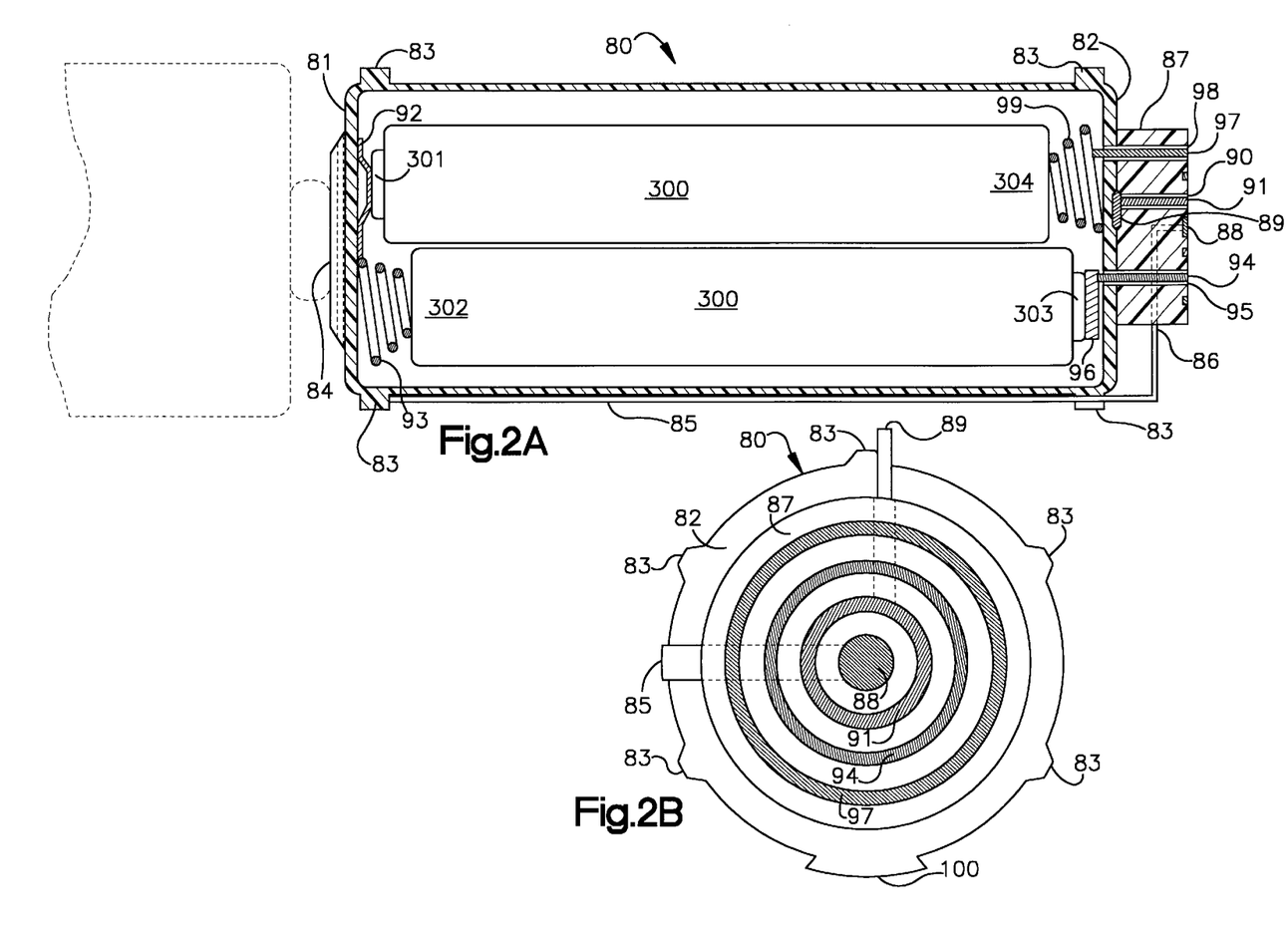
FIG. 2A illustrates a cut-away top view of an alternate embodiment of the secondary power supply and carriage.
FIG. 2B illustrates a front view of the alternate embodiment of the secondary power supply and carriage of FIG. 2A.

Referring now FIG. 2A there is illustrated a cut-away top view of an alternate embodiment of the secondary power supply and carriage generally designated 80.

The body of this elongated secondary power supply and carriage 80 is of a size and shape to accept size "AA", "AAA" or "AAAA" dry-cell or rechargeable batteries. Two "AAA" dry-cell batteries 300 are shown in FIG. 2, however, it is envisioned that two, three, four, five or six batteries may be fitted within the secondary power carriage dependent on the usage.

The elongated secondary power supply and carriage 80 is formed with a roughly half-cylindrical body, a circular rear face 81 and a circular front face 82 of a size corresponding to the diameter of the primary battery supply batteries (not shown) whereby the elongated secondary power supply and carriage 80 may be removably inserted into any device which the primary battery supply slide into. A plurality of non-conductive spacing arms 83 project from both faces 81 & 82 and are of a size and shape to allow the removable insertion of the elongated into an illumination device.

To form a pass-through electrical circuit for primary power supply (not shown), a first conductive link contact 84 is formed as part of the outer wall of the rear face 81 of the elongated secondary power supply and carriage 80 whereby electrical contact is made with the front terminal of the primary power supply which is conducted via the axial carriage shunt 85 into the axial shunt guide 86, on the face of the multiple contact plate 87 formed on the outer wall of the front face 82, and terminating as the first surface electrical contact 88. A second conductive link contact 89 is "L" shaped and affixed to one of the non-conductive spacing arms 83. The second conductive link contact 89 extends to the multiple contact plate 87, via a top guide 90 and terminates at the second surface electrical contact 91 on the face of the multiple contact plate 87. To complete the electrical circuit for the primary power supply a lead wire, conductive housing, or conductive member may be removably affixed to the second conductive link contact 89.

Within the rear of the body of the elongated secondary power supply 80 is affixed a terminal-to-terminal conductive plate 92 which is affixed to a conductive spring 93 at one end. When the two batteries comprising the battery supply 300 are inserted in opposite directions the first positive battery terminal 301 contacts the terminal-to-terminal conductive plate 92 and the second battery contact 302 contacts the conductive spring 93 whereby an electrical connection is created between the two battery units forming the secondary battery supply 300. The third surface electrical contact 94 on the face of the multiple contact plate 87 traverses from the circular front face 82 of elongated secondary battery carriage 80 through the third contact guide 95 and terminates at the positive terminal contact 96 at which point the second positive battery terminal 303 of the secondary battery supply 300 is electrically connected. The fourth surface electrical contact 97 on the face of the multiple contact plate 87 traverses from the circular front face 82 of elongated secondary power supply and carriage 80 through the fourth contact guide 98 and terminates in the second conductive spring 99 at which point the second negative battery terminal 304 of the secondary battery supply 300 is electrically connected.

Referring now FIG. 2B, there is illustrated a front view of the embodiment of the secondary power supply and carriage of FIG. 2A generally designated 80.

Extending perpendicularly and in plane with the front face 82 of the secondary power supply 80 are a plurality of non-conductive spacing arms 83. The axial carriage shunt 85, electrically connected to the first conductive link contact 84 (shown in FIG. 2A), is bent around the side of the secondary power supply 80 in-between two of the non-conductive spacing arms 83 and passes through the shunt guide 86 into the multiple contact plate 87 terminating and connecting to the first surface contact 88. The second conductive link contact 89 is affixed to one of the non-conductive spacing arms 83 and extends to the multiple contact plate 87, via the top guide 90 into the multiple contact plate 87 terminating and connecting to the second surface contact 91, and (not shown) is the electrical connection of the third surface contact 94 and the fourth surface contact 97 to the two "AAA" dry-cell batteries 300.

To assure proper orientation and contact of the second conductive link contact 89 with an exterior electrical contact to the primary power supply, a latching battery carriage catch 100 is formed on the bottom of the secondary power supply and carriage 80 to limit insertion of the secondary power supply and carriage 80 into a tubular device with a matching latch to only one orientation.

Figure 3:
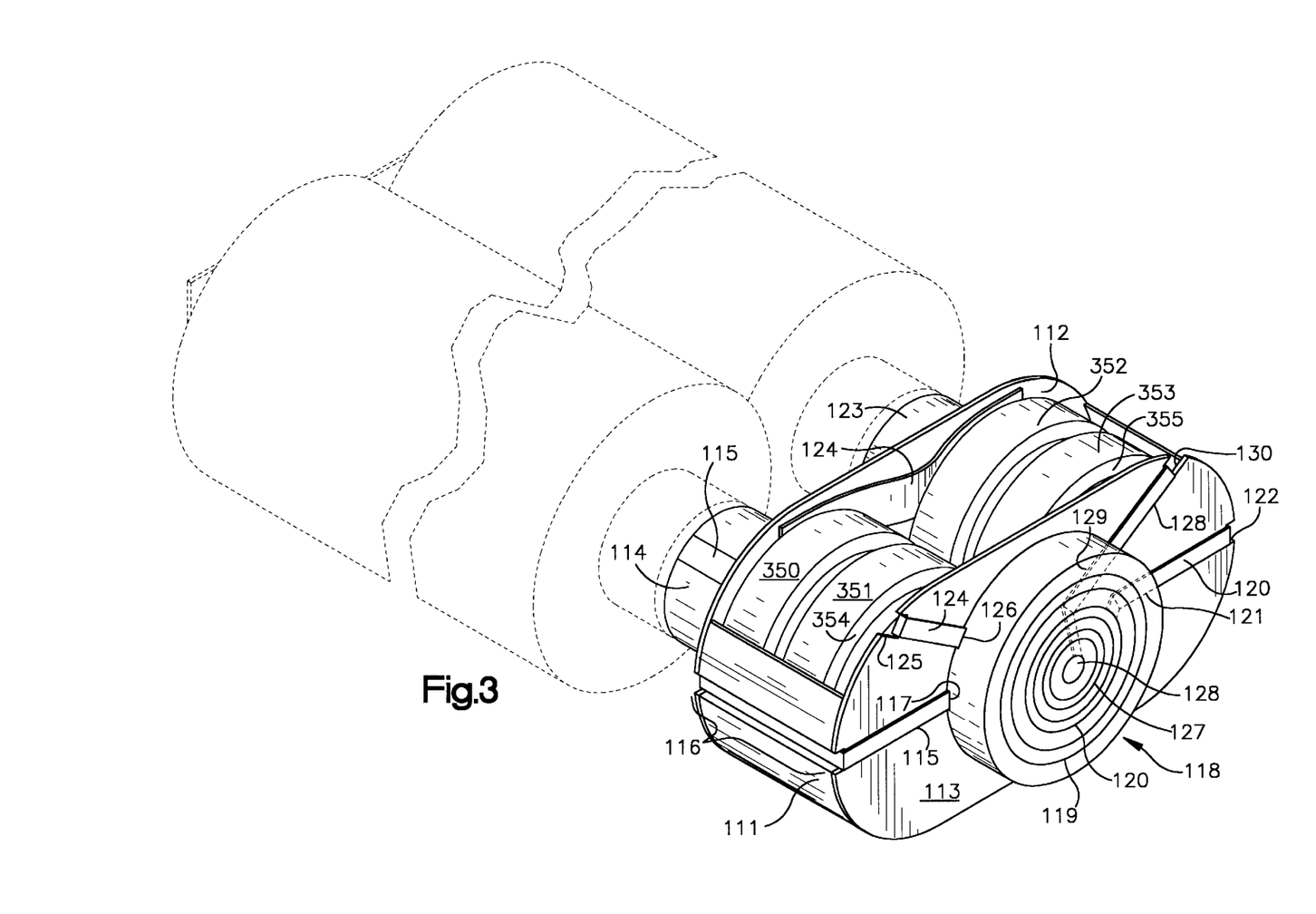
FIG. 3 illustrates a front perspective view of the alternate embodiment of the secondary power supply and carriage.

Referring now FIG. 3, there is a front perspective view of the alternate embodiment of the secondary power carriage 110. This ovoid shaped secondary battery carriage 110 fits within a ovoid cylindrical tubular casing, (not shown) such as that used in a wide variety if flashlights which house batteries in a side-by-side orientation.

The secondary battery carriage 110 is hollow with a roughly half-cylindrical oval body 111, a oval rear face 112, and a oval front face 113. 113.

To form the primary power supply circuit both negative and positive terminals, whereby a primary battery power supply may be electrically connected are formed on the outer wall of the rear face 112 of the secondary battery carriage 110. The first primary power supply contact body 114 is affixed to, or formed as part of, the outer-wall of the rear face 112 and a first conductive strip 115 extends from the rear of the of the first primary power supply contact body 114 around the rear face 112 and through the first elongated guide 116 and around the front face 113, whereby the first primary power supply conductive strip 115 is held remote from the outer edge of the body 111. The first primary power supply conductive strip 115 then extends into the first primary power supply head contact guide 117 formed in the multiple contact plate 118 and terminates on the front of the multiple contact plate 118 at the first conductive terminal 119. The second conductive terminal 120 extends from the front of the multiple contact plate 118 through the second primary power supply head contact guide 121 around the front face 113 through the second elongated guide 122 around the rear face 112 and to the rear of the second primary power supply contact body 123 which is affixed to, or formed as part of, the outer-wall of the rear face 112.

To form the secondary power supply circuit a first row of lithium batteries 350 & 351 and a second row of lithium batteries 352 & 353 are removably inserted into the secondary battery carriage 110. A spring contact strip 124 affixed to the inner-wall of the rear face 112 electrically connects the two row of batteries.

The secondary power supply negative terminal 354 is in held in electrical contact with a third conductive strip 124 extends from the rear of the front face 113 through the first small contact guide 125 around the front face 113 and extends into the first secondary power supply head contact guide 126 formed in the multiple contact plate 118 and terminates on the front of the multiple contact plate 118 at the third conductive terminal 127. The fourth conductive terminal 128 extends from the front of the multiple contact plate 118 through the second secondary power supply head contact guide 129 around the front face 113 through the second small contact guide 130 around to the rear of the front face 113 and is electrical contact with the positive terminal 355 of the secondary power supply.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A modular secondary battery power supply and multiple power supply connector, comprising:
    (a) a roughly half cylindrical non-conductive battery carriage with a roughly circular front and rear;
    (b) a rear conductive battery terminal affixed to the inner face of said circular rear and a front conductive battery terminal affixed to the inner face of said circular front;
    (c) a first battery supply of one or more batteries of a size and shape to fit within said battery carriage;
    (d) a means for removably affixing said first battery supply within said battery carriage whereby said first battery supply is held in contact with rear and a front conductive battery terminals;
    (e) a contact head formed externally on said circular front with first, second, third and fourth connecting terminals, for electrically connecting to an electrical switching means or illumination source;
    (f) an internal conductive strip connecting said rear conductive battery terminal to said contact head whereby said rear conductive battery terminal terminates at said first connecting terminal;
    (g) a short connecting lead connecting said front conductive battery terminal to said contact head whereby said front conductive battery terminal terminates at said second connecting terminal;
    (h) a first outer battery terminal affixed to the exterior wall of said circular rear with a conductive strip connecting said first outer conductive battery terminal to said third connecting terminal;
    (i) a second outer battery terminal affixed to the exterior wall of said circular front with a small conductive strip connecting said second outer battery terminal to said fourth connecting terminal; and,
    (j) a second battery supply externally connected to said first outer battery terminal and to said second outer battery terminal.

2. The modular secondary battery power supply and multiple power supply connector, according to claim 1, wherein said means for removably affixing said first battery supply is one or more conductive springs.

3. The modular secondary battery power supply and multiple power supply connector, according to claim 1, further comprising one or more catches affixed to the exterior of said battery carriage to restrict rotation of said battery carriage during use in a tubular device with matching latches.

4. The modular secondary battery power supply and multiple power supply connector, according to claim 1, wherein said first, second, third and fourth connecting terminals formed on said contact head are a series of separate concentric conductive circles whereby said contact head may freely rotate around its axis without breaking an electrical connection formed with said contact head.

5. A handheld submersible illuminator with a secondary in-line battery power supply, comprising:
    (a) a hollow elongated casing having an open front and rear end and being substantially circular in cross-section with a outwardly protruding cylindrical neck forming a front cover receiving head and a cylindrical tail cap receiving back end;
    (b) a fixed plate mounted within said elongated casing having a illumination mount formed therein;
    (c) one or more illuminating means with positive and negative electrical terminals, of a size and shape to fit snugly within said illumination mount;
    (d) a first power supply of one or more batteries;
    (e) a second power supply, one or more batteries, mounted within a removable battery carriage of a size and shape to fit within said hollow elongated casing;
    (f) a first and a second water-tight electrical switching means for controlling the power supply from said first and second power supplies to said illuminating means;
    (g) a first and a second electrical circuit mounted inside said elongate casing for connecting the electrical flow from said first and second power supplies to said illuminating means and said switching means;
    (h) a removable head cover which mates with said front cover receiving head comprising;
        (1) a parabolic reflecting dish of a size and shape to fit around said illuminating means affixed within said head cover whereby the movement of said head cover adjusts the focal point of said illumination with respect to said parabolic reflecting dish;
        (2) a clear lens affixed with a water-tight collar to the front of said head cover and in front of said parabolic reflecting dish;
    (i) a tail cap which mates with said tail cap receiving back end; and,
    (j) a water-tight sealant means disposed between said front cover receiving head and said head cover and between said tail cap receiving back end and said tail cap for providing water-tight seals.

6. The handheld submersible illuminator with a secondary in-line battery power supply, according to claim 5, wherein said illuminating means is selected from the group consisting of single filament light bulbs, dual filament light bulbs, halide light bulbs, tungsten light bulbs, xenon light bulbs, krypton light bulbs, halogen-krypton light bulbs, halogen-xenon light bulbs, light emitting diodes, laser emitting diodes.

7. The handheld submersible illuminator with a secondary in-line battery power supply, according to claim 5, wherein said batteries are selected from the group consisting of lithium batteries, zinc-air batteries, silver batteries, "AAAA" dry-cell batteries, "AAA" dry-cell batteries, "AA" dry-cell batteries, "C" dry-cell batteries, "N" dry-cell batteries, "D" dry-cell batteries, rechargeable batteries.

8. The handheld submersible illuminator with a secondary in-line battery power supply, according to claim 5, wherein said electrical switching means is selected from the group of "on and off" switches consisting of momentary, push button, pressure sensitive, rotating, rotating momentary, variable resistance locking double push button, sliding, rotating screw-in and out, and rotating slide in and out.

9. The handheld submersible illuminator with a secondary in-line battery power supply, according to claim 5, wherein said illuminating means is one xenon light bulb and one 635–690 nm light emitting diode.

10. The handheld submersible illuminator with a secondary in-line battery power supply, according to claim 5, wherein said illuminating means is one dual filament light bulb with dual set of negative and positive lead wires, whereby both filament may be switchable illuminated.

11. The handheld submersible illuminator with a secondary in-line battery power supply, according to claim 5, wherein said illuminating means are one xenon light bulb and one laser emitting diode with drive circuitry.

12. The handheld submersible illuminator with a secondary in-line battery power supply, according to claim 11, wherein said first water-tight electrical switching means is a double click push button switch with a first and a second lead wire and said second water-tight electrical switching means is a pressure sensitive momentary switch with a first and a second lead wire.

13. The handheld submersible illuminator with a secondary in-line battery power supply, according to claim 12, wherein said first and second electrical circuits further comprise:
  (a) a contact head receiving guide formed on the backside of said contact plate with a light bulb socket and laser diode mount formed therein whereby said positive and said negative terminals of said light bulb and said laser emitting diode extend into said contact head receiving guide, whereby electrical current from two or more electrical terminals may be selectively connected;
  (b) a contact head formed externally on the front of said removable battery carriage with first, second, and third connecting terminals;
  (g) a first conductive strip extending from the positive terminal of said second power supply to said first electrical contact and a second conductive strip extending from the negative terminal of said secondary power supply to said second electrical contact;
  (h) said negative terminal of said laser diode is connected to said first electrical contact and said positive terminal of said laser diode is connected to said first lead of said momentary switch and said second lead of said momentary switch is connect to said second electrical contact; and,
  (i) said negative terminal of said light bulb is connected to said third electrical contact and said positive terminal of said light bulb is connected to said first lead of said double click push-button switch and said second lead of said double click push-button switch is connect to a conductive axial strip which is affixed at its other end to a conductive spring mounted in said end cap.

14. The handheld submersible illuminator with a secondary in-line battery power supply, according to claim 13, wherein said outwardly protruding cylindrical neck includes external threads formed adjacent to said open front end and said removable head cover has internally formed mating threads for mating with said neck threads.

15. The handheld submersible illuminator with a secondary in-line battery power supply, according to claim 14, wherein said back end includes internal threads formed adjacent to said open back end and said tail cap has externally formed mating threads for mating with said back end threads.

16. The handheld submersible illuminator with a secondary in-line battery power supply, according to claim 15, wherein said sealant means comprises one or more O-rings positioned on said head cover receiving front and said tail cap receiving back end.

17. The handheld submersible illuminator with a secondary in-line battery power supply, according to claim 16, wherein said parabolic dish extends over said laser emitting diode and further comprises:
  (a) a series of guide windows aligned with the output of said laser emitting diode;
  (b) one or more optical lens for altering the laser output affixed to one or more of said guide windows whereby the laser output can be selectively altered by selecting a optical lens via the rotation of said parabolic reflecting dish affixed within said removable head cover;
  (c) a gripping surface of ribs formed around the circumference of said removable head cover; and,
  (d) a replaceable hydrogen catalyst means for venting any accumulate hydrogen gases.

18. The handheld submersible illuminator with a secondary in-line battery power supply, according to claim 17, wherein said optical lens is selected from the group consisting of convex lenses, concave lenses, conical lenses, magnifying lenses, condensing lenses, fresnel lenses, diffusion lenses, interference pattern generating gratings, crosshair generator lens, straight line generator lenses, pattern generator lenses, diffractive pattern generators, holographic diffusers, optical diffusion glass, optical diffusion plastic, diffusion filters, circular diffusers, elliptical diffusers, off-axis lenses, off-axis holographic filters, or off-axis holographic diffusers.

19. The handheld submersible illuminator with a secondary in-line battery power supply, according to claim 13, further comprising a one-way water-tight venting valve for gas elimination formed as part of, or affixed through, said elongated casing.

20. A modular secondary battery power supply and multiple power supply connector, comprising:
  (a) a roughly half cylindrical ovoid non-conductive battery carriage with a roughly oval front and rear;
  (b) a first power supply of two or more lithium batteries of a size and shape to fit within said battery carriage, whereby said lithium batteries forming said first power supply are inserted in a side-by-side orientation with each battery's positive contact connected to the next battery's negative contact thereby forming a battery circuit;
  (c) a conductive spring connecting terminal affixed to the inner face of said oval rear, whereby said lithium batteries are held removably in-place and the positive terminal of one row of batteries is electrically connected to the negative terminal of the other row;
  (d) a contact head formed externally on said oval front with first, second, third and fourth connecting terminals, for electrically connecting a plurality of battery supplies to electrical switching means or illumination sources;
  (e) a first battery receiving contact strip connecting the positive terminal of said first power supply to said contact head whereby said first battery receiving contact strip terminates at said first connecting terminal;

(f) a second battery receiving contact strip connecting the negative terminal of said first power supply to said contact head whereby said second battery receiving contact strip terminates at said second connecting terminal;

(g) a first outer conductive battery affixed to the exterior wall of said oval rear with an elongated contact strip affixed around the body of said non-conductive battery carriage connecting said first outer conductive battery terminal to said third connecting terminal;

(h) a second outer conductive battery affixed to the exterior wall of said oval rear with an elongated contact strip affixed around the body of said non-conductive battery carriage connecting said second outer conductive battery terminal to said fourth connecting terminal; and, (i) a second power supply externally connected to said first and second outer battery terminals.

* * * * *